United States Patent Office 2,801,641
Patented Aug. 6, 1957

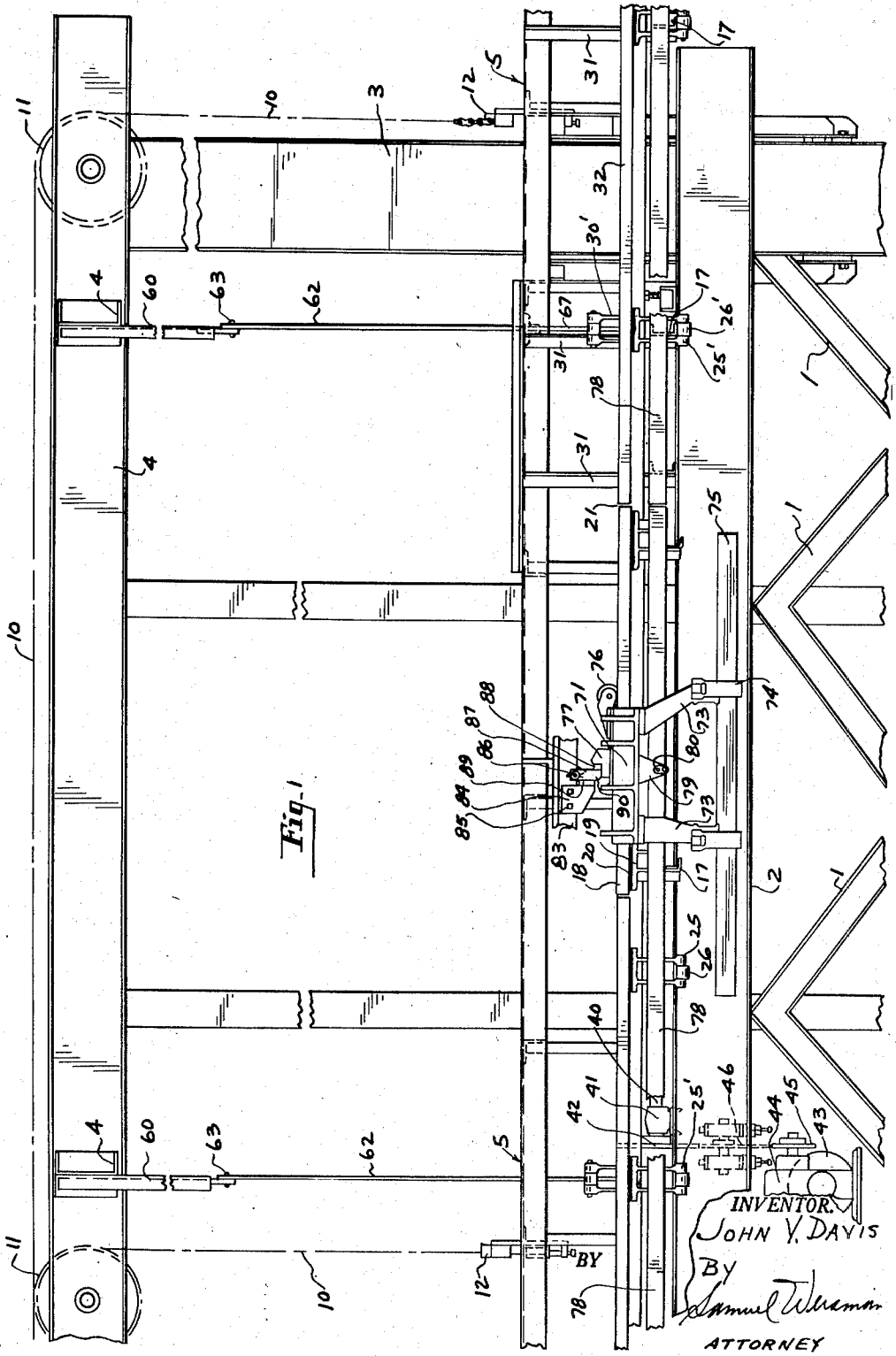

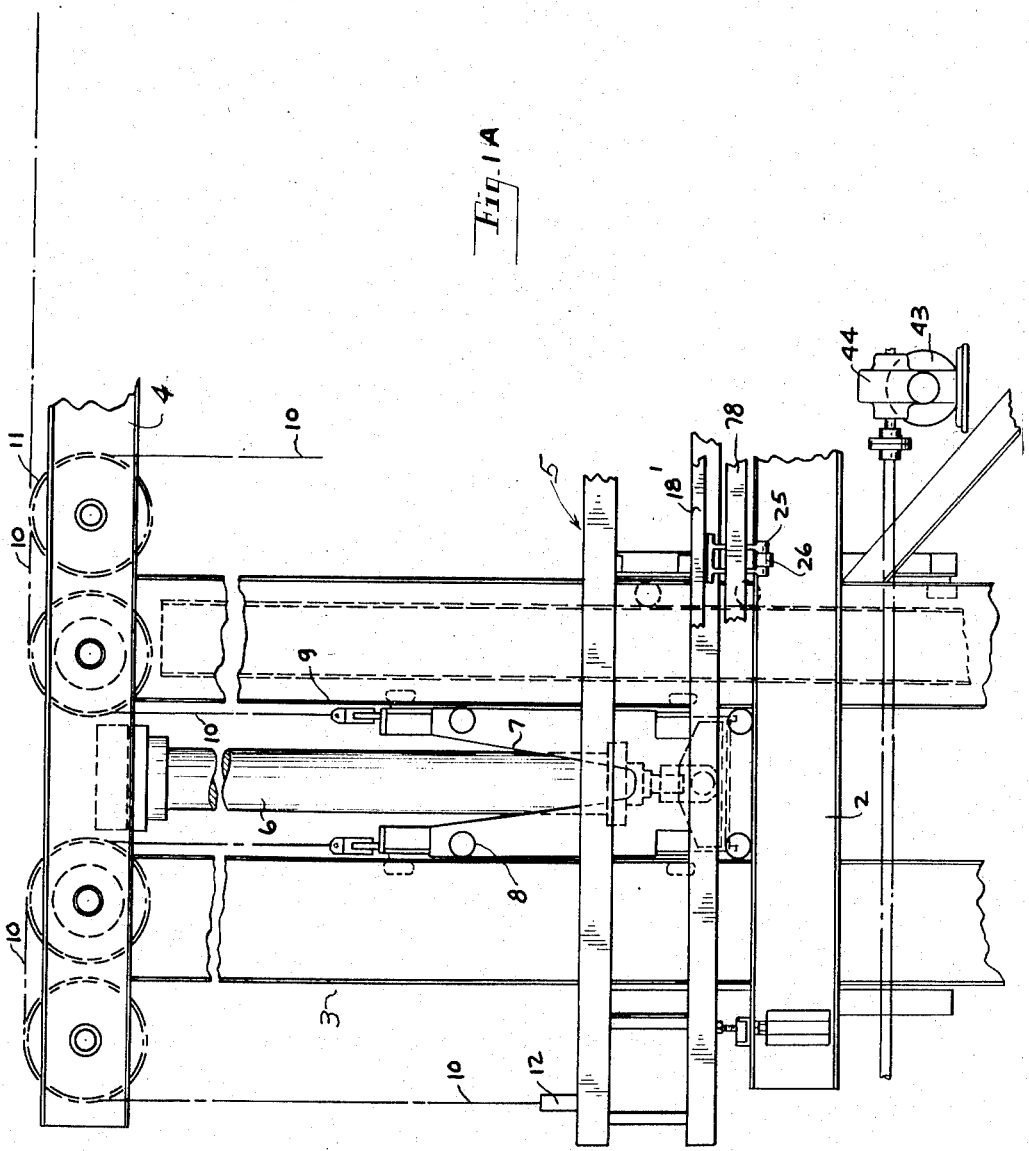

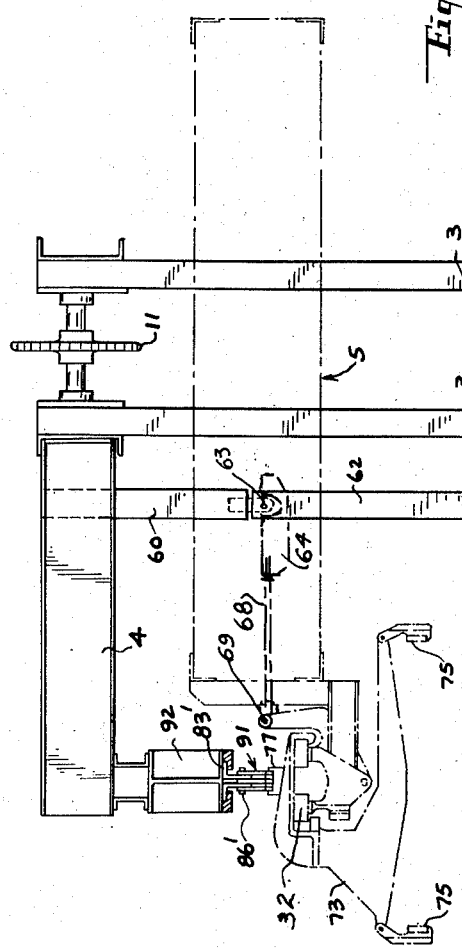

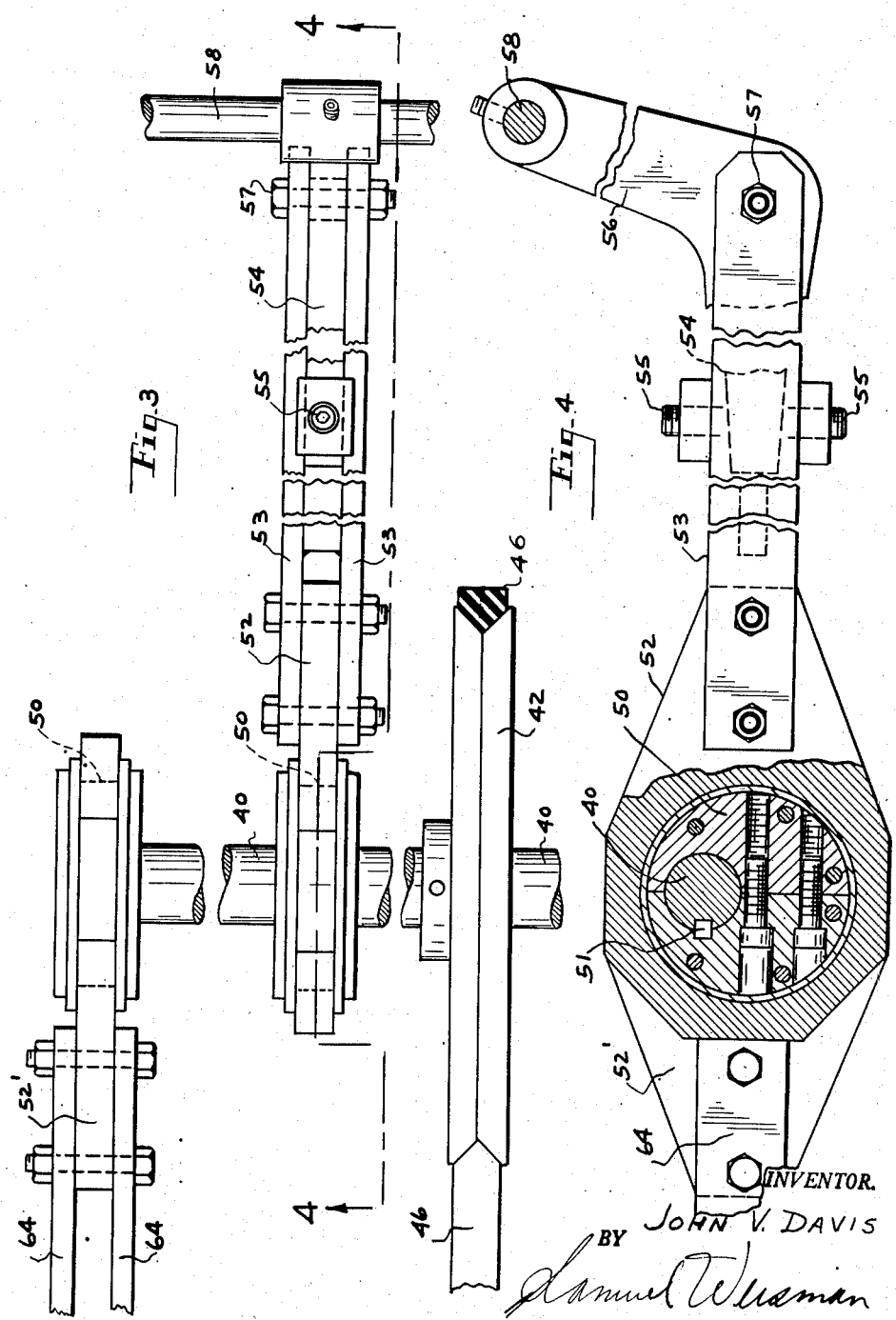

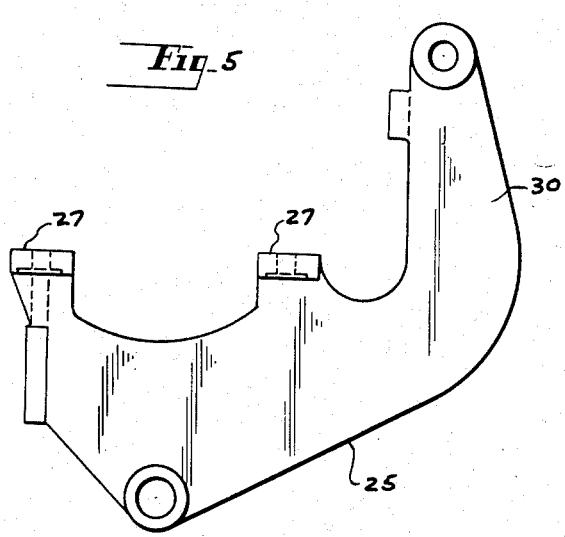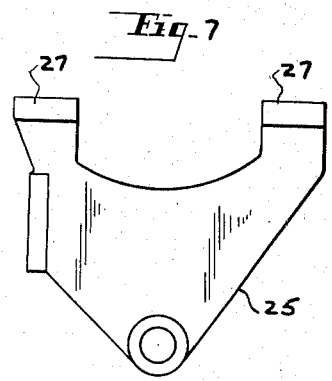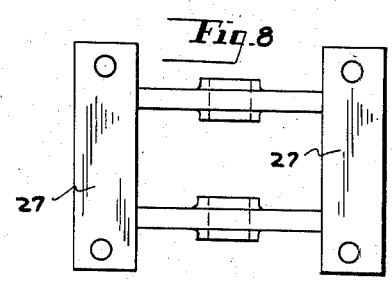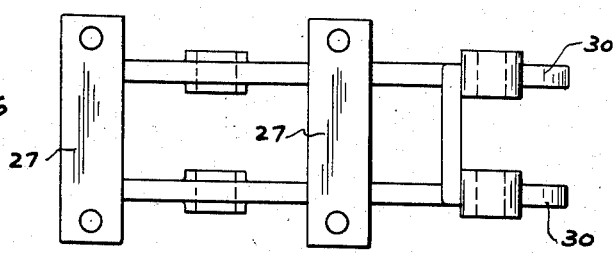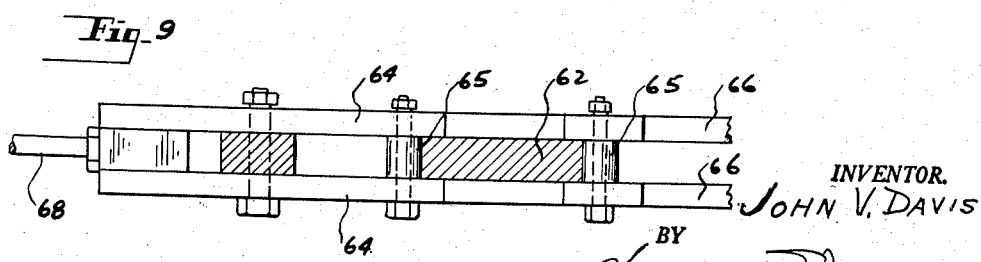

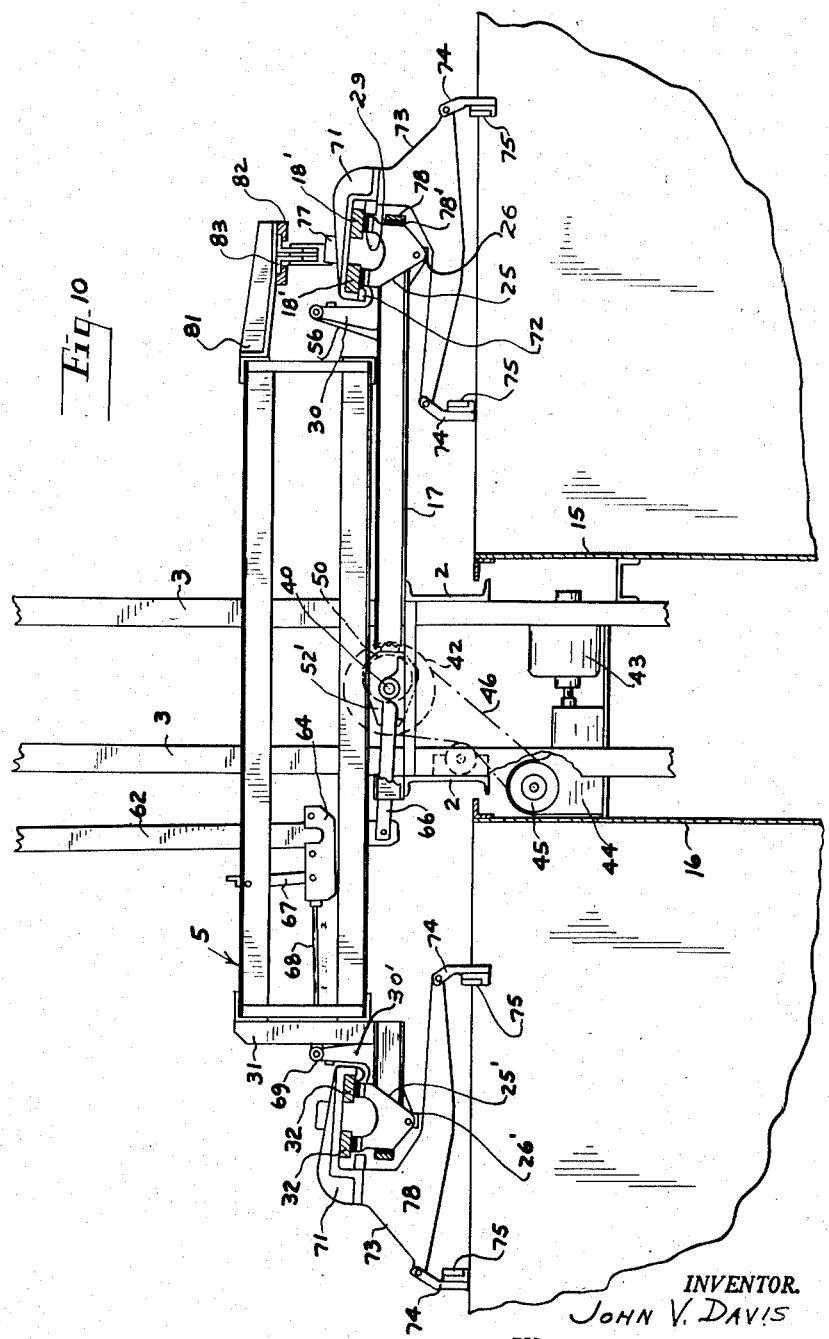

2,801,641

WORK-IMMERSION APPARATUS

John V. Davis, Detroit, Mich., assignor to The Udylite Corporation, Detroit, Mich., a corporation of Delaware Application March 17, 1954, Serial No. 416,835

7 Claims. (Cl. 134—160)

The present invention pertains to a novel mechanism for agitating liquid in tanks in which work is to be treated as in plating and associated operations.

The principal object of the invention is to utilize the suspended and immersed work pieces to agitate the liquid. Work carriers or hooks are propelled along a rail. According to the invention, these carriers or hooks are slidably keyed on the rail in order to tilt if the rail is tilted in an oscillatory movement. Thus, the work pieces sway in the solution and thereby agitate it.

In the accomplishment of the stated object of the invention, segments of rail are carried by brackets pivotally mounted on a fixed structure. An appropriate number of these brackets, at least one for each rail segment, are rocked by suitable means such as a connecting rod oscillated by an eccentric.

In advanced plating operations, the work must be raised over the tank partitions in order to be transferred from one tank to the next, as shown in my Patent No. 2,479,322 of August 16, 1949. For this purpose there is provided a vertically movable chassis carrying the rail segments that traverse the partitions. The chassis is raised at the proper times to permit the transfer of work over the partitions.

The invention provides also for the rocking movement of the vertically movable segments carried by the chassis. However, it is desired that the rocking movement cease when the chassis reaches its upper limit. For example, it may be desired to shift a work carrier from the elevated segment to an alined fixed segment for a delay or interruption in the immersing operation as in my Patent No. 2,591,681 of April 8, 1952.

In such an installation, the rail segments are pivotally supported on the chassis, and the oscillating mechanism embodies means for gradually reducing the rocking movement of the chassis segments to zero as the upper limit is approached. For this purpose a vertical guide rail is pivotally suspended from a fixed superstructure. A block rides on the rail, and the rail is linked to an oscillating device such as an eccentric. The block is also connected or linked pivotally to the corresponding chassis segment.

Thus, as the chassis rises, the block also rises on the rail and has its amplitude gradually reduced. At the upper limit of the chassis, the pivotal axis of the rail segment is in a horizontal plane with the pivotal suspension point of the guide rail, and the block is centered at the latter point. Although the guide rail continues to be oscillated, the amplitude of the block at the pivot point is zero, and consequently no motion is transmitted to the elevated rail segment.

The invention is fully disclosed by way of example in the following description and in the accompanying drawings in which Figures 1 and 1A show a side elevation of the machine, Figure 1A being at the right of Figure 1;
Figure 2 is an end view, partly in section;
Figure 3 is a section on the line 3—3 of Figure 2;
Figure 4 is a section on the line 4—4 of Figure 3;
Figure 5 is an elevation of one of the rail-tilting brackets;
Figure 6 is a plan view thereof;
Figure 7 is an elevation of another such bracket;
Figure 8 is a plan view thereof;
Figure 9 is a section on the line 9—9 of Figure 2, and
Figure 10 is a view similar to Figure 2, showing the rail segments tilted.

Reference to these views will now be made by use of like characters which are employed to designate corresponding parts throughout.

In Figure 7 is shown an elongated base structure 1 having parallel longitudinal members 2 laid on the top thereof to support various parts. A suitable number of vertical members 3 extend upward from the base structure to carry a longitudinal superstructure 4. From the superstructure is suspended a longitudinal chassis 5 lying over the base structure and vertically movable.

The means for suspending and moving the chasses, presently to be described, as well as the frame structure and superstructure are constructed according to particular requirements of size, capacity and other variable characteristics of the machine. Examples of such constructions are disclosed in the aforementioned patents which are now prior art and are regarded as embodied herein to the extent of disclosing a framework, a chassis and means for moving the chassis vertically over the framework.

The vertically movable means disclosed herein comprises a cylinder 6 and a piston rod extending through the lower end of the cylinder. The rod carries a carriage 7 with rollers 8 riding on adjacent vertical members 9. Cables or chains 10 pass over pulleys 11 on the superstructure and are finally attached to the chassis 5 by suitable fastenings 12. Multiple cables or chains 10 may be employed and fastened at various points along the length of the chassis according to the weight of the chassis.

Series of tanks 15 and 16 are mounted on the base structure 1 in two parallel lines lengthwise of the base and may be joined at one or both ends, as known in the art. These series are preferably disposed at opposite sides of the vertical structure 3 as shown in Figures 2 and 10.

Rail supporting bars 17 are secured upon and transversely of the frame members 2, extending approximately to the vertical center of the tank series to support the cathode rails. Fixed rail sections 18 are mounted on some of the supports 17 by suitable brackets 19 with intervening insulation 20. The fixed rail sections 18 are spaced lengthwise at selected locations to leave gaps 21. The gaps are adapted to receive vertically movable rail sections carried by the chassis for the purpose of permitting transfer of work from tank to tank as disclosed in the aforementioned patents.

At least some of the non-lifting rail sections are mounted for a rocking movement. Such sections are provided whereever agitation of the plating or treating solution is desired and are designated by the numeral 18′, Fig. 10. The agitation is performed by the rocking of the suspended work in the liquid. The sections 18′ are mounted on somewhat V-shaped brackets 25 pivotally attached to lugs 26 at the bottom of the rail supports 17. The two upper ends of each bracket 25 provide seats 27 spaced transversely of the tank and on which are secured the twin segments 18′ forming in fact a double cathode rail, insulated at 29 from the seats. At least one of the brackets 25 for each rocking section 18′ is formed with an upstanding arm 30 connected to an oscillating mechanism that will presently be described. Such brackets are shown in Figures 5 and 7.

The previously mentioned vertically movable rail segments are supported from angle brackets 31 secured to the chassis 5. The number of such brackets is determined by the length of the particular section and the load to be carried thereby. Brackets 25' similar to the brackets 25 are pivotally attached to lugs 26' on the brackets 31. The vertically movable twin rail segments 32 are mounted on the pivoted brackets 25', with insulation, as previously described. At least one of the brackets 25' has an upstanding arm 30' for connection to the oscillating mechanism, which will now be described.

A shaft 40 is rotatably mounted in bearings 41 along the longitudinal center of the machine and preferably at the top of the base structure. A drive pulley 42 is mounted concentrically on the shaft 40. Below the shaft the frame structure supports an electric motor 43 which through a gear box 44 drives a pulley 45. The latter is connected to the pulley 42 by a belt or chain 46.

On the shaft 40 are secured eccentrically mounted discs 50 by keys 51 and corresponding in number to the arms 30 and 30'. On the eccentrics are rotatably mounted throw arms or cranks 52 and 52' corresponding respectively to the arms 30 and 30'. To each crank 52 is secured a connecting rod 53 with an extension 54 mounted telescopically therein and secured in lengthwise adjustment by set screws 55. To the free end of the extension is attached a link 56 by a pivot 57, extending to the free upper end of the corresponding arm 30 to which it is pivoted at 58. This mechanism rocks those rail sections 18' that are not vertically movable. The rocking of the vertically movable rail sections 32 on the chassis 5 requires a different arrangement. From the superstructure 4 is rigidly suspended a strip 60. From this strip is suspended a guide rail 62 at a pivot point 63 having a predetermined location as will presently be shown. A block 64 is adapted to ride on the rail 62 at rollers 65 carried by the block. An assembly of this character is provided for each arm 30' in transverse alinement therewith, and the lower ends of the rails 62 are connected to the corresponding throws 52' by links or rods 66, Figures 2 and 9.

Work carriers are slidably mounted on the several rail sections at suitably spaced intervals. Each such carrier comprises a body 71 overlying both rails of the particular section and having at one side a lip 72 turned under the rail at that side to hook under it. From the other side are suspended two beams 73 extending crosswise of the tanks. From each end of each beam is pivotally suspended a bracket 74, and the two brackets alined lengthwise at either side of the cathode rail section are joined by a longitudinal bar 75 from which work racks or work pieces are suspended in any desired manner.

The forward end of the body 71 carries rollers 76 riding on the rails for the purpose described in my co-pending application Serial No. 337,047; filed February 18, 1953. Behind the rollers a pusher block 77 is secured on the body 71 to be engaged by a pusher.

The several alined pivotal brackets 25 are joined by an inside anode rail 78 insulated at 78'. The body 71 carries a suspended insulated bracket 79 on which is mounted a contact 80 engaging the anode rail 78.

At suitable intervals on the chassis are secured pusher guide brackets 81 extending over the non-lifting rail sections. These brackets are spanned by a pair of opposed angle members 82 that guide the sliding pusher assembly. This assembly includes a pair of angle bars 83 slidably mounted in the members 82 and attached to a spacer 84 by volts 85. A pivot pin 86 through the bars 83 suspends a pair of pusher arms 87 joined at their lower ends by a tie bar 88 adapted to engage the push block 77. A transverse spacer 89 is secured to the spacer 84 and abuts both arms 87.

The pusher bars 83 extend a considerable length of the machine and in some cases sufficiently to carry the pusher assemblies for the carriers in several liquid compartments. The bars 83 are reciprocated by suitable timed means, as shown for example in the aforementioned patents. The rear lower corner of each pusher arm 87 is bevelled at 90 to ride idly over the push blocks 77 on the rearward or retracting movement of the pusher assembly.

The pusher assemblies supported from the brackets 71 operate on carriers that hold immersed work pieces. The vertically movable rail sections 32 which enable the transfer of the work from tank to tank receive the carriers 71—75 in their course through the machine. For moving the work in the elevated position, pusher assemblies 91 similar to that already described are supported from the superstructure 4 by depending structures 92 of such vertical dimension that the pusher bars engage the pusher blocks 77 in the terminal elevated position. These fixed elevated pusher assemblies are operated only when the chassis 5 is in the uppermost position. Corresponding parts thereof are indicated at 83' and 86' in Figure 2. The adjustment and timing of the apparatus may be such that a given elevated carrier will pass entirely over a tank beneath, eliminating treatment in that tank, as described in Patent No. 2,591,681 of April 8, 1952.

In the operation of the device, it is evident from the foregoing description that the various rail segments are oscillated when in the lower position as shown in Figure 10. It may be noted that the vertically movable segments are oscillated through arm 66, suspended rail 62, block 64, rod 63, and brackets 25', 30'.

As the segment 32 rises, the amplitude of its rocking movement diminishes because of the shortening distance between the block 64 and the pivot point 63 of the guide member 62. Finally, when the upper limit is reached as shown in dotted lines in Figure 2, the pivot point 63 is on the same level as the rocking pivot 69 and also lies midway of the depth of the recess 70 in block 64. Thus, there is no rocking movement of the fully elevated rail segments 32. Rocking of the work, which is unnecessary and undesirable in the elevated position, is eliminated. Further, it becomes possible to shift the elevated carrier from the segment 32 to an alined fixed rail segment (not shown) for an interval of interruption or for removal from the system, as disclosed in my aforementioned Patent No. 2,591,681.

Although a specific embodiment of the invention has been illustrated and described, it will be understood that various alterations in the details of construction will be made without departing from the scope of the invention as indicated by the appended claims.

What I claim is:

1. In an apparatus for treating work in liquid, a structure including a tank, a bracket mounted on a single fixed pivot on a horizontal axis on said structure, directly over said tank, a rail carried by said bracket directly over said tank, a work carrier keyed to and straddling the upper surface of said rail, said work carrier being slidably suspended from said rail to a position directly over said tank and being supported solely by said rail, means on said carrier for the suspension of work therefrom into said tank, said work suspending means being spaced laterally from said horizontal pivot axis, means for sliding said carrier on said rail, an arm extending upwardly from said bracket, a rod linked to said arm, and means for oscillating said rod, whereby to rock said carrier and work carried thereby with a combined vertical and horizontal motion, the amount of said vertical motion of the work being greater than the amount of horizontal motion.

2. In an apparatus for treating work in liquid, a fixed structure including a superstructure, a tank below said superstructure, a chassis mounted between said structure and said superstructure, means for moving said chassis vertically between said structure and said superstructure, a bracket pivotally carried by said chassis over said tank, a rail carried by said bracket, a work carrier slidably keyed on said rail, means for rocking said bracket on its pivotal mounting, whereby to rock said carrier and work carried thereby, and means for reducing the amplitude of the rocking movement to zero as said chassis reaches its uppermost position.

3. In an apparatus for treating work in liquid, a fixed structure including a superstructure, a tank below said superstructure, a chassis mounted between said structure and said superstructure, means for moving said chassis vertically between said structure and said superstructure, a bracket pivotally carried by said chassis over said tank, a rail carried by said bracket, a work carrier slidably keyed on said rail, a guide rail pivotally suspended from said superstructure, means for rocking said guide rail, a block slidably mounted on the guide rail, a slidable connection from said block to said bracket for rocking the bracket, whereby the amplitude of the rocking movement of said bracket is gradually reduced as said chassis approaches said superstructure.

4. In an apparatus for treating work in liquid, a fixed structure including a superstructure, a tank below said superstructure, a chassis mounted between said structure and said superstructure, means for moving said chassis vertically between said structure and said superstructure, a bracket pivotally carried by said chassis over said tank, a rail carried by said bracket, a work carrier slidably keyed on said rail, a guide rail pivotally suspended from said superstructure, means for rocking said guide rail, a block slidably mounted on the guide rail, a slidable connection from said block to said bracket for rocking the bracket, the pivotal suspension point of said guide rail lying in a horizontal line with the axis of said pivotal connection to said bracket in the uppermost position of said chassis, whereby the amplitude of the rocking movement of said bracket is reduced to zero in the uppermost position of said chassis.

5. In an apparatus for treating work in liquid, a fixed structure including a superstructure, a tank below said superstructure, a chassis mounted between said structure and said superstructure, means for moving said chassis vertically between said structure and said superstructure, a bracket pivotally mounted on a horizontal axis on said structure over said tank, a rail carried by said bracket for movement therewith, a work carrier slidably keyed on said rail, means for rocking said bracket on its pivotal mounting, whereby to rock said carrier and work carried thereby, another bracket pivotally carried by said chassis over said tank, a rail carried by the second bracket for movement therewith, and adapted to aline with the first rail to receive said work carrier, means for rocking said second bracket on its pivotal mounting, whereby to rock said carrier and work carried thereby, and means for reducing the amplitude of the rocking movement of the second bracket to zero as said chassis reaches its uppermost position.

6. In an apparatus for treating work in liquid, a fixed structure including a superstructure, a tank below said superstructure, a chassis mounted between said structure and said superstructure, means for moving said chassis vertically between said structure and said superstructure, a bracket pivotally mounted on a horizontal axis on said structure over said tank, a rail carried by said bracket for movement therewith, a work carrier slidably keyed one said rail, means for rocking said bracket on its pivotal mounting, whereby to rock said carrier and work carried thereby, another bracket pivotally carried by said chassis over said tank, a rail carried by the second bracket for movement therewith, and adapted to aline with the first rail to receive said work carrier, a guide rail pivotally suspended from said superstructure, means for rocking said guide rail, a block slidably mounted on said guide rail, a pivotal connection from said block to the second bracket, whereby the amplitude of the rocking movement of the second bracket is gradually reduced as said chassis approaches said superstructure.

7. In an apparatus for treating work in liquid, a fixed structure including a superstructure, a tank below said superstructure, a chassis mounted between said structure and said superstructure, means for moving said chassis vertically between said structure and said superstructure, a bracket pivotally mounted on a horizontal axis on said structure over said tank, a rail carried by said bracket for movement therewith, a work carrier slidably keyed on said rail, means for rocking said bracket on its pivotal mounting, whereby to rock said carrier and work carried thereby, another bracket pivotally carried by said chassis over said tank, a rail carried by the second bracket for movement therewith, and adapted to aline with the first rail to receive said work carrier, a guide rail pivotally suspended from said superstructure, means for rocking said guide rail, a block slidably mounted on said guide rail, a pivotal connection from said block to the second bracket, the pivotal suspension point of said guide rail lying in a horizontal line with the axis of said pivotal connection to said bracket in the uppermost position of said chassis, whereby the amplitude of the rocking movement of said bracket is reduced to zero in the uppermost position of said chassis.

References Cited in the file of this patent
UNITED STATES PATENTS

| Number | Name | Date |
| --- | --- | --- |
| 678,392 | Gauhe | July 16, 1901 |
| 1,225,774 | Cook | May 15, 1917 |
| 2,023,668 | Daw | Dec. 10, 1935 |
| 2,222,839 | Hall | Nov. 26, 1940 |
| 2,341,606 | Finston | Feb. 15, 1944 |
| 2,461,113 | Friedman | Feb. 8, 1949 |
| 2,591,681 | Davis | Apr. 8, 1952 |